(12) United States Patent
Bono et al.

(10) Patent No.: US 11,126,553 B2
(45) Date of Patent: Sep. 21, 2021

(54) DYNAMIC ALLOCATION OF MEMORY BETWEEN CONTAINERS

(71) Applicant: EMC IP Holding Company LLC, Hopkinton, MA (US)

(72) Inventors: Jean-Pierre Bono, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 16/263,629

(22) Filed: Jan. 31, 2019

(65) Prior Publication Data

US 2020/0250087 A1 Aug. 6, 2020

(51) Int. Cl.
*G06F 12/084* (2016.01)
*G06F 12/0871* (2016.01)
*G06F 12/02* (2006.01)
*G06F 12/0855* (2016.01)
*G06F 12/0882* (2016.01)
(Continued)

(52) U.S. Cl.
CPC ........ *G06F 12/084* (2013.01); *G06F 9/45558* (2013.01); *G06F 9/5016* (2013.01); *G06F 12/0276* (2013.01); *G06F 12/0855* (2013.01); *G06F 12/0871* (2013.01);
(Continued)

(58) Field of Classification Search
CPC ............... G06F 12/084; G06F 12/0855; G06F 12/0871; G06F 12/0882; G06F 12/0276; G06F 12/0891; G06F 9/5016; G06F 9/45558; G06F 2009/45583; G06N 5/003
See application file for complete search history.

(56) References Cited

U.S. PATENT DOCUMENTS 7,206,863 B1 * 4/2007 Oliveira ................. G06F 3/061
709/218
9,454,497 B2 * 9/2016 Nakajima ........... G06F 12/1475
(Continued)

OTHER PUBLICATIONS

Jean-Pierre Bono; "Managing Data Using Network Attached Storage (NAS) Cluster," U.S. Appl. No. 15/664,366, filed Jul. 31, 2017.
(Continued)

*Primary Examiner* — Kalpit Parikh
(74) *Attorney, Agent, or Firm* — BainwoodHuang

(57) ABSTRACT

Techniques are presented for dynamically allocating memory between containers. These techniques include (a) assigning a first portion of memory to a first container and a second portion of memory to a second container, the first and second portions overlapping to form a shared portion of memory assigned to both containers; (b) during a first interval, caching first data in a particular page of the shared portion by first data storage software executing within the first container; (c) during a second interval, caching second data in the particular page of the shared portion by second data storage software executing within the second container; (d) during the first interval, selectively enabling the first data storage software to access the particular page and blocking the second data storage software from accessing the particular page; and (e) during the second interval, selectively enabling the second data storage software to access the particular page and blocking the first data storage software from accessing the particular page.

16 Claims, 7 Drawing Sheets

(51) Int. Cl.
  *G06F 9/50*     (2006.01)
  *G06N 5/00*     (2006.01)
  *G06F 9/455*    (2018.01)
  *G06F 12/0891*  (2016.01)

(52) U.S. Cl.
  CPC ...... *G06F 12/0882* (2013.01); *G06F 12/0891* (2013.01); *G06N 5/003* (2013.01); *G06F 2009/45583* (2013.01)

(56) References Cited

U.S. PATENT DOCUMENTS

| | | |
|---|---|---|
| 9,696,919 B1 | 7/2017 | Vankamamidi et al. |
| 2006/0090042 A1* | 4/2006 | Nakatani ................ G06F 3/067 711/147 |
| 2018/0285140 A1* | 10/2018 | Kaplan ............... G06F 9/45558 |
| 2019/0163636 A1* | 5/2019 | Yang .................. G06F 12/0848 |

OTHER PUBLICATIONS

Jean-Pierre Bono, et al.; "Sharing Processor Cores in a Data Storage System," U.S. Appl. No. 16/263,263, filed Jan. 31, 2019.

* cited by examiner

Fig. 4
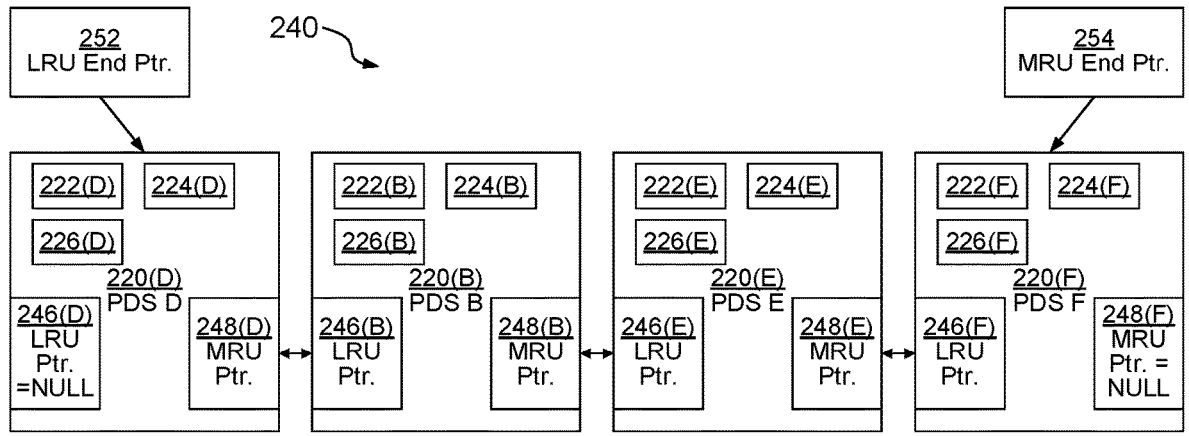
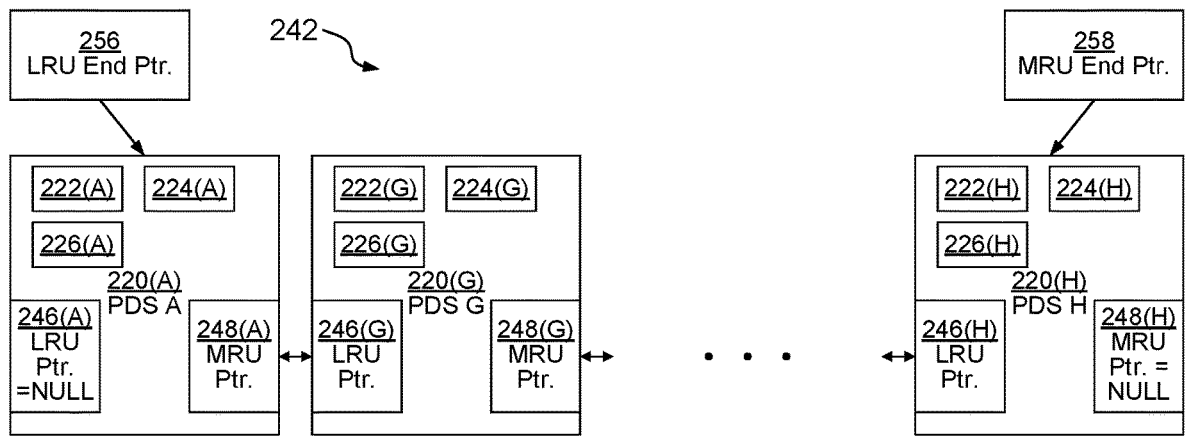
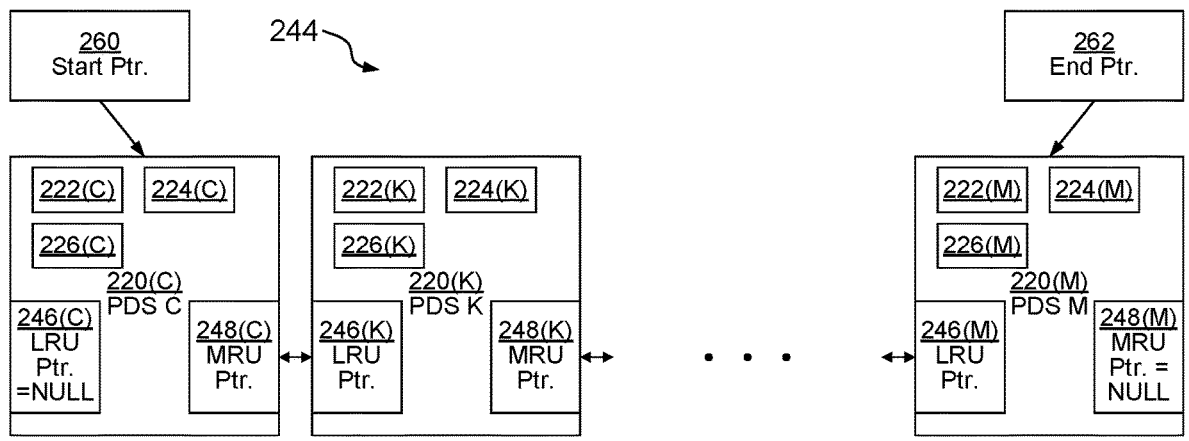

DYNAMIC ALLOCATION OF MEMORY BETWEEN CONTAINERS

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices In some cases, it is desirable to implement different storage-related processes on a single storage processor. Some data storage systems implement such processes within respective virtual machines. As virtual machines require significant overhead, however, some data storage systems instead implement different storage-related processes within respective containers. Each container runs in its own isolated userspace instance over a kernel shared with other containers. This arrangement allows for reduced overhead while still maintaining isolation between the processes.

SUMMARY

Unfortunately, the above-described conventional data storage systems using multiple containers may experience limitations. For example, container implementations typically assign memory resources at initialization time. Thus, if it turns out that one container requires more memory resources than another, it is generally not possible to update the memory allocations on the fly. As a result, the system may either suffer from inefficient thrashing of virtual memory or force the containers to be restarted to assign to them a more proper amount of memory, which may result in downtime.

In order to address this deficiency, it would be desirable to implement containers that are able to utilize memory resources in a dynamic manner. This may be accomplished by instantiating multiple containers and assigning them an overlapping memory area, while implementing a mechanism to allow the containers to claim and release portions of the overlapping memory area dynamically. In some embodiments, the mechanism employs page assignment metadata shared between the containers. In some embodiments, the dynamic sharing of the memory resources may involve indirect page mapping. In some embodiments, cooperative budgeting is employed to dynamically apportion the overlapping memory area based on memory needs. The improved approach thus achieves the reduced overhead associated with containers without sacrificing the ability to dynamically allocate memory between or among containers. The improved approach is thus efficient and cost-effective without sacrificing functionality.

In one embodiment, a computerized method for dynamically allocating memory between containers that run on a common operating system kernel of the computing device is provided. The method includes (a) assigning a first portion of memory to a first container and a second portion of memory to a second container different from the first container, the first portion and the second portion overlapping to form a shared portion of memory assigned to both the first container and the second container; (b) during a first time interval, caching first data in a particular page of the shared portion by first data storage software executing within the first container; (c) during a second time interval, which occurs entirely after the first time interval has ended, caching second data different from the first data in the particular page of the shared portion by second data storage software different from the first data storage software and executing within the second container; (d) during the first time interval, selectively enabling the first data storage software to access the particular page and blocking the second data storage software from accessing the particular page; and (e) during the second time interval, selectively enabling the second data storage software to access the particular page and blocking the first data storage software from accessing the particular page. Systems, apparatuses, and computer program products for performing similar methods are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 is a block diagram depicting example data structures stored within memory according to various embodiments.

DETAILED DESCRIPTION OF THE INVENTION

Embodiments are directed to techniques for implementing containers that are able to utilize memory resources in a dynamic manner by instantiating multiple containers and assigning them an overlapping memory area, while implementing a mechanism to allow the containers to claim and release portions of the overlapping memory area dynamically. In some embodiments, the mechanism employs page assignment metadata shared between the containers. In some embodiments, the dynamic sharing of the memory resources may involve indirect page mapping. In some embodiments, cooperative budgeting is employed to dynamically apportion the overlapping memory area based on memory needs. The improved approach thus achieves the reduced overhead associated with containers without sacrificing the ability to dynamically allocate memory between or among containers. The improved approach is thus efficient and cost-effective without sacrificing functionality.

Figure 1:
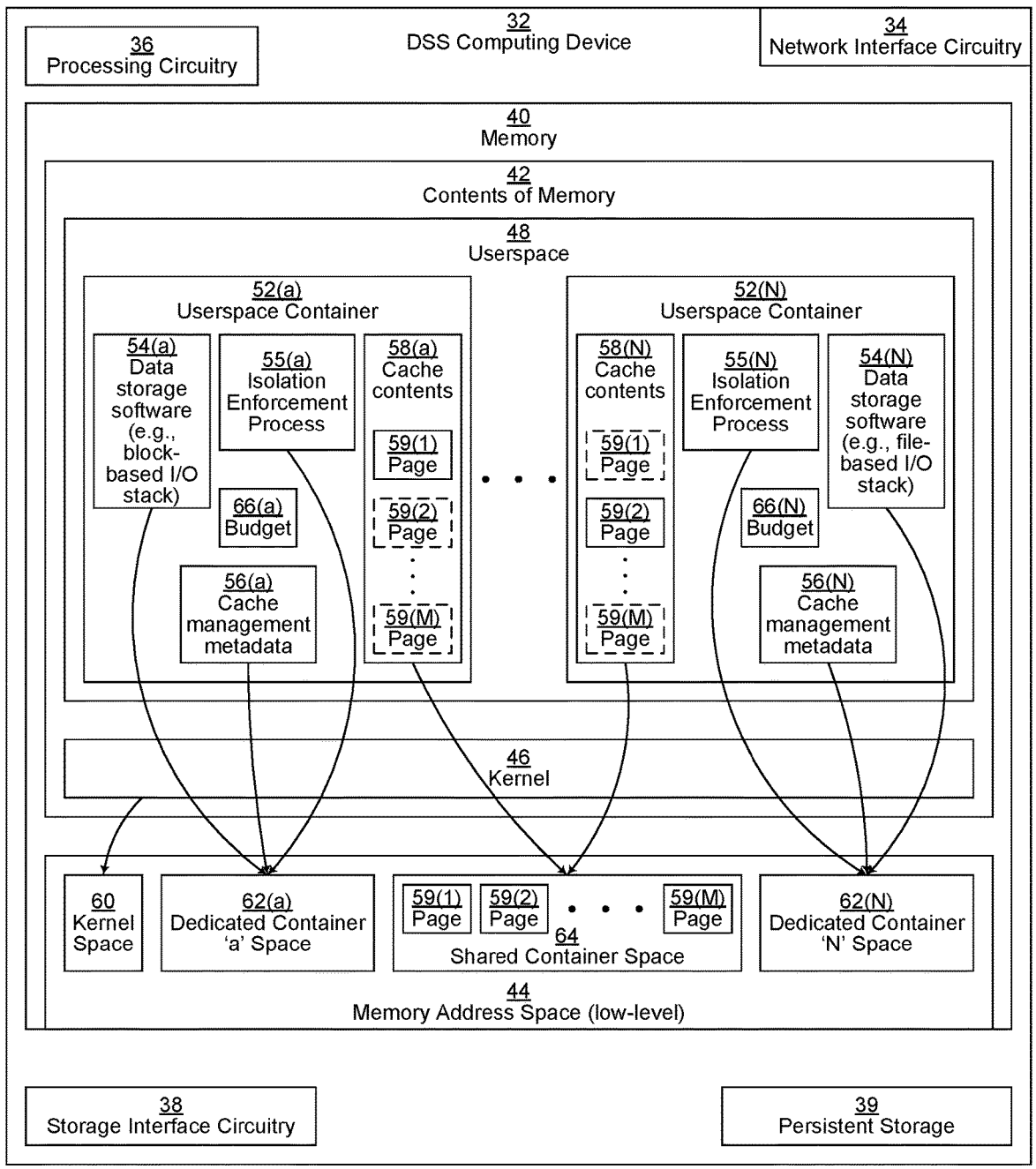
FIG. 1 is a block diagram depicting an example system and apparatus for use in connection with various embodiments.

FIG. 1 depicts an example environment 30 including a data storage system (DSS) computing device 32. DSS computing device 32 may connect to one or more host devices configured to send I/O requests to the DSS computing device 32 for fulfillment over a network.

DSS Computing device 32 may be any kind of computing device capable of servicing I/O requests, such as, for example, a personal computer, workstation, server computer, enterprise server, data storage system (DSS) rack server, laptop computer, tablet computer, smart phone, mobile computer, etc. In one example, DSS computing device 32 is a DSS rack server, such as, for example, a VNX, VNXe, VMAX, Unity, or Trident data storage system produced by Dell/EMC of Hopkinton, Mass.

DSS computing device 32 includes network interface circuitry 34, processing circuitry 36, storage interface circuitry 38, persistent data storage 39, and memory 40. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the DSS computing device 32 to communicate with one or more host devices (not depicted) capable of sending data storage commands to the DSS computing device 32 over the network for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage processors (SPs, not depicted) each mounted on a separate board, each SP having its own network interface circuitry 34, processing circuitry 36, storage interface circuitry 38, and memory 40, but sharing the persistent storage 39 between them. In such embodiments, a high-speed inter-SP bus may connect the SPs. There may be more than one SP installed in DSS computing device 32 for redundancy and performance reasons. In these embodiments, each SP may be considered independently for purposes of this disclosure.

Persistent storage 39 may include any kind of persistent storage devices, such as, for example, hard disk drives, solid-state storage devices (SSDs), flash drives, etc. Storage interface circuitry 38 controls and provides access to persistent storage 39. Storage interface circuitry 38 may include, for example, SCSI, SAS, ATA, SATA, FC, M.2, and/or other similar controllers and ports.

Memory 40 may be any kind of digital system memory, such as, for example, random access memory (RAM). Memory 40 stores various executing software and related data as part of its contents 42. Memory contents 42 includes a protected kernel 46 of an operating system (OS, not depicted) in operation (e.g., a Linux, UNIX, Windows, MacOS, or similar operating system) as well as a userspace 48 for user-level applications and data. As depicted, userspace 48 includes a plurality of isolated containers 52 (depicted as userspace containers 52(a), . . . , 52(N)). Each container 52 may run its own software in isolation from the other containers 52, and each container 52 is assigned its own memory space. Each container 52 represents a distinct virtual environment run using operating-system-level virtualization, as is well-known in the art. For example, in some embodiments, the containerization may be implemented using Docker containerization software distributed by Docker, Inc. of San Francisco, Calif.

Memory 40 may also be conceived as a low-level address space 44. The address space 44 of memory 40 may be arranged as a set of spaces. Thus, low-level address space 44 includes a kernel space 60 which is dedicated to exclusive access by the kernel 46. Low-level address space 44 also includes various dedicated container spaces 62. Each dedicated container space 62 is dedicated to exclusive access by a particular container. Thus, as depicted, dedicated container space 62(a) is dedicated to exclusive access by container 52(a), while dedicated container space 62(N) is dedicated to exclusive access by container 52(N). In addition, low-level address space 44 also includes a shared container space 64 which is accessible by several different containers 52 (e.g., by containers 52(a) and 52(N)). For example, if memory 40 is made up of 128 gigabytes (GB) of DRAM, the kernel space 60 may occupy 25 GB, dedicated container spaces 62(a), 62(N) may occupy 11 GB each, and shared container space 64 may occupy 81 GB. In principle, the total amount of allocated memory 40 may exceed the 128 GB of physical memory 40 if there is a swap file (e.g., drawn from persistent storage 39), but in many embodiments it is preferable to avoid the use of a swap file if possible. Upon creation, each container 52 is allocated memory from the low-level address space 44 as well as a mapping (not depicted) from its own internal memory space (which may be sparse) to the underlying allocated memory. Thus, kernel space 60 may occupy a low-level memory address range of 0 GB to 25 GB, dedicated container space 62(a) may occupy a low-level memory address range of 25 GB to 36 GB, shared container space 64 may occupy a low-level memory address range of 36 GB to 117 GB, and dedicated container space 62(N) may occupy a low-level memory address range of 117 GB to 128 GB. However, the mapping from the internal sparse memory space of the dedicated container space 62(a) to the low-level address space 44 may include a mapping from 0 GB to 11 GB of local memory mapped to the low-level memory address range of 25 GB to 36 GB of the low-level address space 44 (which is the dedicated container space 62(a)), a second mapping of from 100 GB to 101 GB of local memory mapped to the low-level memory address range of 36 GB to 37 GB of the low-level address space 44 (which is the first GB of the shared container space 64), and a third mapping of from 1000 GB to 1080 GB of local memory mapped to the low-level memory address range of 37 GB to 117 GB of the low-level address space 44 (which is the remaining 80 GB of the shared container space 64). Similarly, the mapping from the internal sparse memory space of the dedicated container space 62(N) to the low-level address space 44 may include a mapping from 0 GB to 11 GB of local memory mapped to the low-level memory address range of 117 GB to 128 GB of the low-level address space 44 (which is the dedicated container space 62(N)), a second mapping of from 100 GB to 101 GB of local memory mapped to the low-level memory address range of 36 GB to 37 GB of the low-level address space 44 (which is the first GB of the shared container space 64), and a third mapping of from 1000 GB to 1080 GB of local memory mapped to the low-level memory address range of 37 GB to 117 GB of the low-level address space 44 (which is the remaining 80 GB of the shared container space 64). Thus, each container 52(a), 52(N) has 92 GB of total underlying memory, some of which is shared and some of which is dedicated.

However, although multiple containers 52(a), 52(N) share the shared container space 64, in order to maintain proper isolation between them, each container 52 may run an isolation enforcement process 55 that coordinates with isolation enforcement processes 55 running on other userspace containers 52 to set and enforce a budget 66 for each container 52 so that every page 59 of the shared container space 64 is assigned to only one container 52 at a time, in a proportion based on the memory needs of each container 52.

Each userspace container 52 includes data storage software 54, cache management metadata 56, and an isolation enforcement process 55, all of which are typically located within the dedicated container space 62 for that container 52. Data storage software 54 may be any kind of software used for implementing data storage features of a data storage system. In some example embodiments, the data storage software 54 may take the form of a driver stack (which may include several different storage-related drivers, not depicted, that are arranged in a stack configuration) or a portion of a driver stack for processing input/output (I/O) requests directed at the persistent storage 39. Thus, for example, as depicted in FIG. 1, data storage software 54(a) of userspace container 52(a) may be a block-based I/O stack, which is configured to receive and process block-based I/O requests from remote host computers (and from local processes running on the DSS computing device 32 itself). Block-based I/O requests are requests that make reference to block-level addressing using block-level protocols such as SCSI, iSCSI, and Fibre Channel, as is well-known in the art. As another example, as depicted in FIG. 1, data storage software 54(N) of userspace container 52(N) may be a file-based I/O stack, which is configured to receive and process file-based I/O requests from remote host computers (and from local processes running on the DSS computing device 32 itself). File-based I/O requests are requests that make reference to file-level addressing using file-level protocols such as NFS, FTP, and SMB, as is well-known in the art.

The data storage software 54 of each container 52 is configured to make use of one or more caches to provide an increased level of performance due to the increased speed and reduced latency of memory 40 as opposed to persistent storage 39. The data storage software 54 may include separate or unified caches for data, metadata, reading, and writing. Each cache may include cache organization information such as a hash table and cache entries (see below in connection with FIG. 3). This cache organization information as well as information about mapping between cache entries and particular pages 59 within cache contents 58 may be stored as cache management metadata 56 within the dedicated container space for the container 52.

Each container 52 also includes cache contents 58, which maps to at the shared container space 64. Cache contents 58 include M pages 59 (depicted as pages 59(1), 59(2), . . . , 59(M)). A page 59 is typically a unit of memory at the lowest-level at which memory may be addressed. For example, in many systems, a page is 8 kilobytes (KB) in size. In one example, shared container space 64 is 81 GB in size, including 1 GB of container usage metadata (not depicted in FIG. 1), leaving 80 GB for storage of M=10 million 8-KB pages 59. At any given time, any given page 59 is assigned to either a particular one of the containers 52 or to no particular container 52. Thus, as depicted in FIG. 1, page 59(1) is assigned to container 52(a) (as illustrated by the solid line around page 59(1) within cache contents 58(a)), page 59(2) is assigned to container 52(N) (as illustrated by the solid line around page 59(2) within cache contents 58(N)), and page 59(M) is not assigned to any container 52 (as illustrated by the dashed lines around page 59(M) within cache contents 58(a), 58(N), indicating that neither container 52 is assigned page 59(M)).

The budget 66 for each container 52 indicated how many pages 59 it is allowed to make use of within its cache contents 58 at any given time. The budgets 66 may be initially assigned upon creation of each container. Thus, for example, in one embodiment, block-based storage is given preference, so budget 66(a) is initially set to 6 million pages 59, and budget 66(N) is initially set to 4 million pages 59. In some embodiments, as the data storage software 54 on each container 52 continues to operate, it may become apparent that one container 52 needs more memory for its cache contents than another (or than the others). Thus, the isolation enforcement processes 55 may communicate to assign updated budgets 66 to the various containers 52 based on their needs and usage patterns. Thus, for example, if file-based I/O tends to spike during business hours, while block-based I/O tends to spike during late-night hours, budget 66(a) may be decreased to 3 million pages 10 pm-3 am, while budget 66(N) is increased to 7 million pages during that time period, and budget 66(a) may be increased to 8 million pages 9 am-5 pm, while budget 66(N) is decreased to 2 million pages during that time period, although the exact budgets 66 and times may vary from day to day.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 39 is configured to store programs and data even while the DSS computing device 32 is powered off. The OS, applications, data storage software 54, and isolation enforcement processes 55 are typically stored in this persistent storage portion of memory 40 or on persistent storage 39 so that they may be loaded into a system portion of memory 40 from this persistent storage portion of memory 40 or persistent storage 39 upon a system restart or as needed. Both the data storage software 54 and the isolation enforcement processes 55, when stored in non-transient form either in the volatile portion of memory 40 or on persistent storage 39 or in persistent portion of memory 40, each form a respective computer program product. The processing circuitry 36 running one or more of data storage software 54 and isolation enforcement processes 55 thus forms a specialized circuit constructed and arranged to carry out the various processes described herein.

It should be understood that access to persistent storage 39 is typically slower than access to memory 40 (excluding the persistent storage portion of memory 40), typically by an order of magnitude or more.

Figure 2:
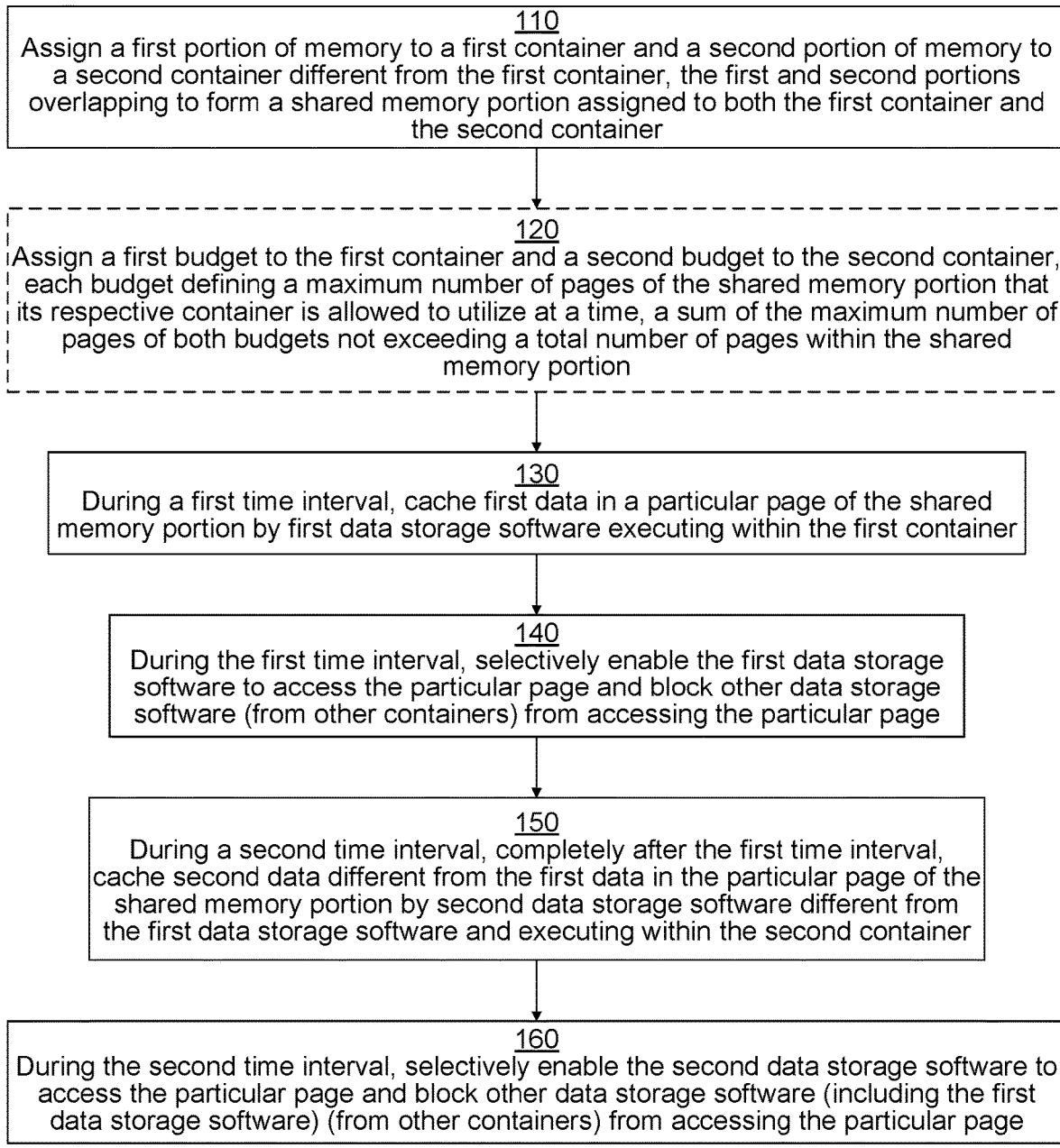
FIG. 2 is a flowchart depicting example methods according to various embodiments.

FIG. 2 illustrates an example method 100 performed by DSS computing device 32 for dynamically allocating memory 40 between containers 52. It should be understood that any time a piece of software (e.g., data storage software 54, isolation enforcement process 55, OS, etc.) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Step 120 of method 100 marked with dashed lines may be deemed to be optional in some embodiments. Method 100 is performed by computing device 32.

In step 110, containerization software (not depicted) running on DSS computing device 32, such as, for example, Docker daemon, assigns a first portion (e.g., dedicated container space 62(a) plus shared container space 64) of memory 40 to a first container 52(a) and a second portion (e.g., dedicated container space 62(N) plus shared container space 64) of memory 40 to a second container 52(N) different from the first container 52(a), the first and second portions overlapping to form a shared memory portion (e.g., shared container space 64) assigned to both the first container 52(a) and the second container 52(N). This assignment step 110 may also include creating a mapping from local memory space of each container 52 to the underlying low-level memory address space 44, as described above. It should be understood that this step 110 may also include assigning additional portions of memory 40 to additional containers 52, some of which may also include the shared container space 64. It should be understood however, that, in some embodiments, there may be one or more containers 52 whose underlying memory portions do not include the shared container space 64.

At some point after step 110, the containerization software also instantiates each of the at least two containers 52, including the isolation enforcement process 55 of each.

In step 120, one or more processes assign a first budget 66(a) to the first container 52(a) and a second budget 66(N) to the second container 52(N), each budget 66 defining a maximum number of pages 59 of the shared container space 64 that its respective container 52 is allowed to utilize at a time, a sum of the maximum number of pages of both budgets 66 not exceeding a total number, M, of pages 59 within the shared container space 64. In some embodiments, this initial assignment is distributed evenly among the overlapping containers 52, while in other embodiments, it is done according to a pre-defined ratio based on qualities of particular containers 52. In some embodiments, a master assignment process (not depicted) performs the initial assignment, while in other embodiments, the isolation enforcement processes 55 of the at least two overlapping containers 52(a), 52(N) cooperate to perform step 120.

At some point prior to step 130 (typically after step 120), data storage software 54 is instantiated on each container 52 to begin processing I/O commands. This includes creating one or more caches having cache management metadata 56 for each container 52.

In step 130, during a first time interval, data storage software 54(a) operating in the first container 52(a) caches first data in a particular page (e.g., page 59(x)) of the shared container space 64.

In step 140, during the first time interval, isolation enforcement process 55(a) selectively enables the first data storage software 54(a) to access the particular page (e.g., page 59(x)), and isolation enforcement process 55(N) selectively blocks the second data storage software 54(N) (and other isolation processes 55 running on any other container 52 also block data storage software 54 running on that container 52) from accessing the particular page (e.g., page 59(x)). This step may include each isolation enforcement process 55 making reference to the cache management metadata 56 for its respective container 52.

Then, in step 150, during a second time interval completely after the first time interval, data storage software 54(N) operating in the second container 52(N) caches second data different from the first data in the same particular page (e.g., page 59(x)) of the shared container space 64.

In step 160, during the second time interval, isolation enforcement process 55(N) selectively enables the second data storage software 54(N) to access the particular page (e.g., page 59(x)), and isolation enforcement process 55(a) selectively blocks the first data storage software 54(a) (and other isolation processes 55 running on any other container 52 also block data storage software 54 running on that container 52) from accessing the particular page (e.g., page 59(x)). This step may include each isolation enforcement process 55 making reference to the cache management metadata 56 for its respective container 52.

Figure 3:
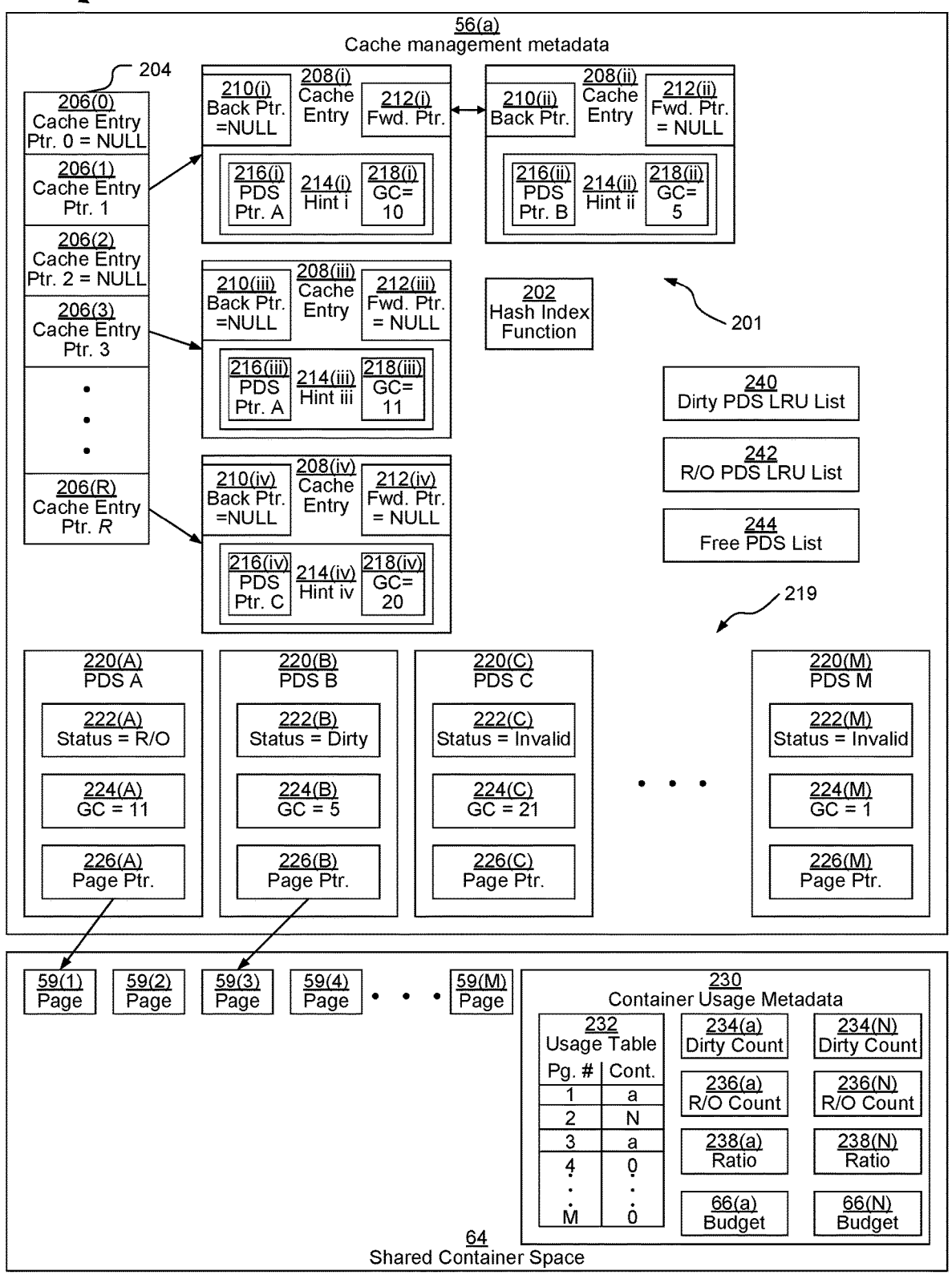
FIG. 3 is a block diagram depicting example data structures stored within memory according to various embodiments.

FIG. 3 illustrates an example arrangement 200 of cache management metadata 56(a) of an example container 56(a) and of shared container space 64 within memory 40 in more detail according to one embodiment.

Cache management metadata 56(a) includes cache organization information 201 for a particular cache (e.g., a data cache) used by data storage software 54(a) as well as a set 219 of page descriptor structures (PDSes) 220 (depicted as PDSes 220(A), 220(B), 220(C), . . . , 220(M)). As depicted, there are exactly MPDSes 220, so that in the extreme case in which the budget 66(a) for container 52(a) is for the maximum number M of pages 59 within shared container space 64, there is a PDS 220 for each page 59.

Cache organization information 201 includes a hash index function 202 which is configured to receive a hash digest of a block of data as an input and to output an index within the range of zero to R for some integer R (e.g., R=1000). The hash digest represents cached data stored within a page 59. The hash digest may be, for example, a value that was generated by applying a cryptographic hashing algorithm to the data stored within the page 59. In an example, the hashing algorithm is SHA-2, although this is not required, as other algorithms may also be used, such as SHA-0, SHA-1, SHA-3, and MD5. Such algorithms may provide bit-depths such as 128 bits, 160 bits, 172 bits, 224 bits, 256 bits, 384 bits, and 512 bits, for example. Preferably an advanced hashing algorithm with a high bit-depth is used to ensure a low probability of hash collisions between different data blocks, such as fewer than one collision in $2^{80}$ or $2^{128}$, for example. Hash index function 202 is designed to evenly distribute all possible hash digests (e.g., ranging from zero to $2^{256}-1$) into R+1 bins. The output of hash index function 202 is used as an index into an array 204 of cache entry pointers 206 (depicted as cache entry pointers 206(0), 206(1), 206(2), 206(3), . . . , 206(R)), which may be sparsely populated. Thus, as depicted, many of the cache entry pointers 206 have NULL values. Other cache entry pointers 206(1), 206(3), 206(R) point to cache entries 208, which may be arranged in linked lists.

Each cache entry 208 includes a hint 214, which is a data structure configured to indirectly point to a page 59 that stores cached data. Each hint 214 includes a PDS pointer 216 that points to a particular PDS 220 that may, in turn, point to a page 59 within the shared container space 64. However, the PDS pointer 216 may not necessarily be valid, because pages 59 and PDSes 220 may be reclaimed for other uses even though the cache entry and the hint 214 remain. Thus, in some embodiments, each hint 214 also contains a generation counter (GC) 218. If the GC 218 within the hint 214 matches the GC 224 within the PDS 220 that the PDS pointer 216 points to, then the hint 214 is valid, and the cached data can be found at the page 59 pointed to by a page pointer 226 within that PDS 220. However, if the GC 218 within the hint 214 does not match the GC 224 within the PDS 220 that the PDS pointer 216 points to, then the hint 214 is not valid, meaning either that the PDS 220 and the page 59 that it points to have been reclaimed by another cache entry 208 or the page 59 has been removed from assignment to the container 52(*a*) by the isolation enforcement process 55(*a*).

Each cache entry 208 may also store a back pointer 210 and a forward pointer 212 to effectuate a linked list structure for each bin associated with each respective cache entry pointer 206 (although, in some embodiments, only a forward pointer 212 is used, thereby effectuating only a single-linked list rather than a doubly-linked list). As depicted, cache entry pointer 206(1) points to a linked list having cached entries 208(*i*), 208(*ii*). Cached entry 208(I) has a NULL back pointer 210(*i*) indicating that it is the first cached entry 208 in the linked list of the bin of cache entry pointer 206(1). Cached entry 208(*i*) also has a forward pointer 212(*i*) that points to the next cached entry 208(*ii*) in the linked list of the bin of cache entry pointer 206(1). Cached entry 208(*ii*) has a back pointer 210(*ii*) that points to the previous cached entry 208(*i*) in the linked list of the bin of cache entry pointer 206(1). Cached entry 208(*ii*) also has a NULL forward pointer 212(*ii*) indicating that it is the last cached entry 208 in the linked list of the bin of cache entry pointer 206(1).

As depicted, cache entry pointer 206(3) points to a linked list having only a single cached entry 208(*iii*). Cached entry 208(*iii*) has a NULL back pointer 210(*iii*) indicating that it is the first cached entry 208 in the linked list of the bin of cache entry pointer 206(3). Cached entry 208(*iii*) also has a NULL forward pointer 212(*iii*) indicating that it is the last cached entry 208 in the linked list of the bin of cache entry pointer 206(3).

As depicted, cache entry pointer 206(R) points to a linked list having only a single cached entry 208(*iv*). Cached entry 208(*iv*) has a NULL back pointer 210(*iv*) indicating that it is the first cached entry 208 in the linked list of the bin of cache entry pointer 206(R). Cached entry 208(*iv*) also has a NULL forward pointer 212(*iv*) indicating that it is the last cached entry 208 in the linked list of the bin of cache entry pointer 206(R).

Each cache entry 208 may also store a least-recently-used (LRU) pointer (not depicted) and a most-recently-used (MRU) pointer (not depicted) to effectuate a linked list structure for deciding which cache entry 208 and associated PDSes 220 and pages 59 to evict from the cache when room must be made for a new cache entry 208 and associated PDSes 220 and pages 59.

As depicted, cache entry 208(*i*) points, via hint 214(*i*), to PDS 220(A). However, since the GC 218(*i*) of hint 214(*i*) is 10 and the GC 224(A) of PDS 220(A) is 11, hint 214(*i*) is invalid.

As depicted, cache entry 208(*ii*) points, via hint 214(*ii*), to PDS 220(B). Since the GC 218(*ii*) of hint 214(*ii*) is 5 and the GC 224(B) of PDS 220(B) is also 5, hint 214(*ii*) is valid. Since PDS 220(B) includes a page pointer 226(B) that points to page 59(3), cache entry 208(*ii*) represents the data of page 59(3), and it may be inferred that page 59(3) is currently assigned to container 52(*a*).

As depicted, cache entry 208(*iii*) points, via hint 214(*iii*), to PDS 220(A). Since the GC 218(*iii*) of hint 214(*iii*) is 11 and the GC 224(A) of PDS 220(A) is also 11, hint 214(*iii*) is valid. Since PDS 220(A) includes a page pointer 226(A) that points to page 59(1), cache entry 208(*iii*) represents the data of page 59(1), and it may be inferred that page 59(1) is currently assigned to container 52(*a*).

As depicted, cache entry 208(*iv*) points, via hint 214(*iv*), to PDS 220(C). However, since the GC 218(*iv*) of hint 214(*iv*) is 20 and the GC 224(C) of PDS 220(C) is 21, hint 214(*iv*) is invalid.

Each PDS 220 includes a status indicator 222. Status indicators 222 may take several values, including Read-Only (R/O), Dirty, and Invalid. Thus, for example, PDS 220(A) is R/O, PDS 220(B) is dirty, and PDSes 220(C), 220(M) are invalid.

Since PDS 220(A) is R/O, it means that the data stored in page 59(1) is read-cached, and it is consistent with data of a corresponding block stored on persistent storage 39. No changes can be made to the data within the page 59(1) as long as the status of PDS 220(A) remains R/O.

Since PDS 220(B) is dirty, it means that the data stored in page 59(3) is write-cached, and its data is not yet persisted to persistent storage 39. Changes can still be made to the data within the page 59(3) as long as the status of PDS 220(A) remains dirty.

Since PDSes 220(C), 220(M) are invalid, their page pointers 226(C), 226(M) are ignored, and they therefore are not currently associated with any pages 59. In some embodiments, since PDC 220(C) previously did point to a page 59 (implied by the fact that its GC 224(C) is greater than 1 and the fact that hint 214(*iv*) includes a PDS pointer 216(*iv*) that points to PDS 220(C)), page pointer 226(C) may still point to the last page 59 that was associated with PDS 220(C), even if that page 59 is now claimed by another container 52 (e.g., page 59(2) claimed by container 52(N)); however, the invalid status 222(C) prevents such page pointer 226(C) from being accessed; in addition, the fact that GC 224(C) is different than GC 218(*iv*) also has a similar effect. In other embodiments, whenever the status 222 of a PDS 220 is set to be invalid, its page pointer 226 is automatically reset to NULL or some other invalid value. In some embodiments, status 222 may not include an invalid option; therefore, whenever the status 222 would have been set to invalid in the other embodiments, the page pointer 226 is reset to NULL instead.

The various PDSes 220 may be maintained on one of three different lists 240, 242, 244. Dirty PDS LRU list 240 is a linked list that includes all PDSes 220 that are dirty (e.g., PDS 220(B)), arranged in order of how recently each PDS 220 thereon was last accessed. R/O PDS LRU list 242 is a linked list that includes all PDSes 220 that are R/O (e.g., PDS 220(A)), arranged in order of how recently each PDS 220 thereon was last accessed. Free PDS list 244 is a linked list that includes all PDSes 220 that are invalid (e.g., PDS 220(C), 220(M)). Further detail with respect to these lists 240, 242, 244 is provided below in connection with FIG. 4.

Shared container space 64, in addition to including M pages 59 also includes container usage metadata 230 that is also accessible to the various containers 52 that are assigned to the shared container space 64. Container usage metadata 230 includes a usage table 232 as well as various additional information for each container 52 that shares the shared container space 64: a dirty page count 234, a R/O page count 236, a ratio 238, and a budget 66. Usage table 232 stores a container assignment for each page 59 of the shared container space 64. Thus, as depicted, pages 59(1), 59(3) are assigned to container 52(*a*), page 59(2) is assigned to container 52(N), and pages 59(4), 59(M) are not currently assigned to any container 52 (the lack of assignment being represented by the number 0). Although depicted as a table, usage table 232 may in fact be a bitmap or a similar structure, in which the container assignments are listed sequentially, the position in the list indicating which page 59 is being referred to.

Dirty page count 234(a) is a count of how many pages 59 in a dirty state are assigned to container 52(a). Dirty page count 234(N) is a count of how many pages 59 in a dirty state are assigned to container 52(N).

R/O page count 234(a) is a count of how many pages 59 in a R/O state are assigned to container 52(a). R/O page count 234(N) is a count of how many pages 59 in a R/O state are assigned to container 52(N).

Ratio 238(a) is a ratio of the dirty page count 234(a) divided by the total number of pages 59 assigned to container 52(a). Ratio 238(N) is a ratio of the dirty page count 234(N) divided by the total number of pages 59 assigned to container 52(N). In some embodiments, additional ratios (not depicted) may also be stored for each container (e.g., also including ratios involving the R/O counts 236). Based on the values of 234, 236, 238, etc., a budget 66 is assigned to each container 66. This may be done either by a central authority or cooperatively by the isolations enforcement processes of each container 52.

FIG. 4 depicts an example arrangement 245 of lists 240, 242, 244 in more detail.

As mentioned above, dirty PDS LRU list 240 is structured as an LRU list. More precisely, dirty PDS LRU list 240 is structured as an eviction linked list structure. An LRU end pointer 252 points to a first dirty PDS 220(D) at a least-recently-used end of the eviction linked list structure, while MRU end pointer 254 points to a last dirty PDS 220(F) at a most-recently-used end of the eviction linked list structure. Each PDS 220 has an LRU pointer 246 and an MRU pointer 248 that allow the eviction linked list structure to be traversed. As depicted, PDS 220(D) has a NULL LRU pointer 246(D) indicating that it is the least-recently accessed dirty PDS 220 in the eviction linked list structure. PDS 220(D) also has an MRU pointer 248(D) that points to the next dirty PDS 220(B) in the eviction linked list structure. PDS 220(B) has an LRU pointer 246(D) that points to the previous dirty PDS 220(D) in the eviction linked list structure. PDS 220(B) also has an MRU pointer 248(B) that points to the next dirty PDS 220(E) in the eviction linked list structure. PDS 220(E) has an LRU pointer 246(E) that points to the previous dirty PDS 220(B) in the eviction linked list structure. PDS 220(E) also has an MRU pointer 248(E) that points to the next dirty PDS 220(F) in the eviction linked list structure. PDS 220(F) has an LRU pointer 246(F) that points to the previous dirty PDS 220(E) in the eviction linked list structure. PDS 220(F) also has a NULL MRU pointer 248(F) indicating that it is the last dirty PDS 220 in the eviction linked list structure.

R/O PDS LRU list 242 has a structure that is similar to the dirty PDS LRU list 240. Thus, R/O PDS LRU list 242 is also structured as an LRU list, and more precisely, R/O PDS LRU list 242 is structured as an eviction linked list structure. An LRU end pointer 256 points to a first R/O PDS 220(A) at a least-recently-used end of the eviction linked list structure, while MRU end pointer 258 points to a last R/O PDS 220(H) at a most-recently-used end of the eviction linked list structure. As depicted, R/O PDS LRU list 242 has R/O PDS 220(A) as its least-recently-used element, followed by R/O PDS 220(G) as its second-least-recently-used element. Its most-recently-used element is R/O PDS 220(H).

Free PDS list 244 has a structure that is largely similar to the dirty PDS LRU list 240. Thus, free PDS list 244 is also structured as an eviction linked list structure, but it is not an LRU style list, since there is no need to keep track of least recent access. A start pointer 260 points to a first invalid PDS 220(C) at one end of the eviction linked list structure, while an end pointer 262 points to a last invalid PDS 220(M) at another end of the eviction linked list structure. As depicted, free PDS list 242 has invalid PDS 220(C) as its first element, followed by invalid PDS 220(K) as its second element. Its last element is invalid PDS 220(M).

Figure 5:
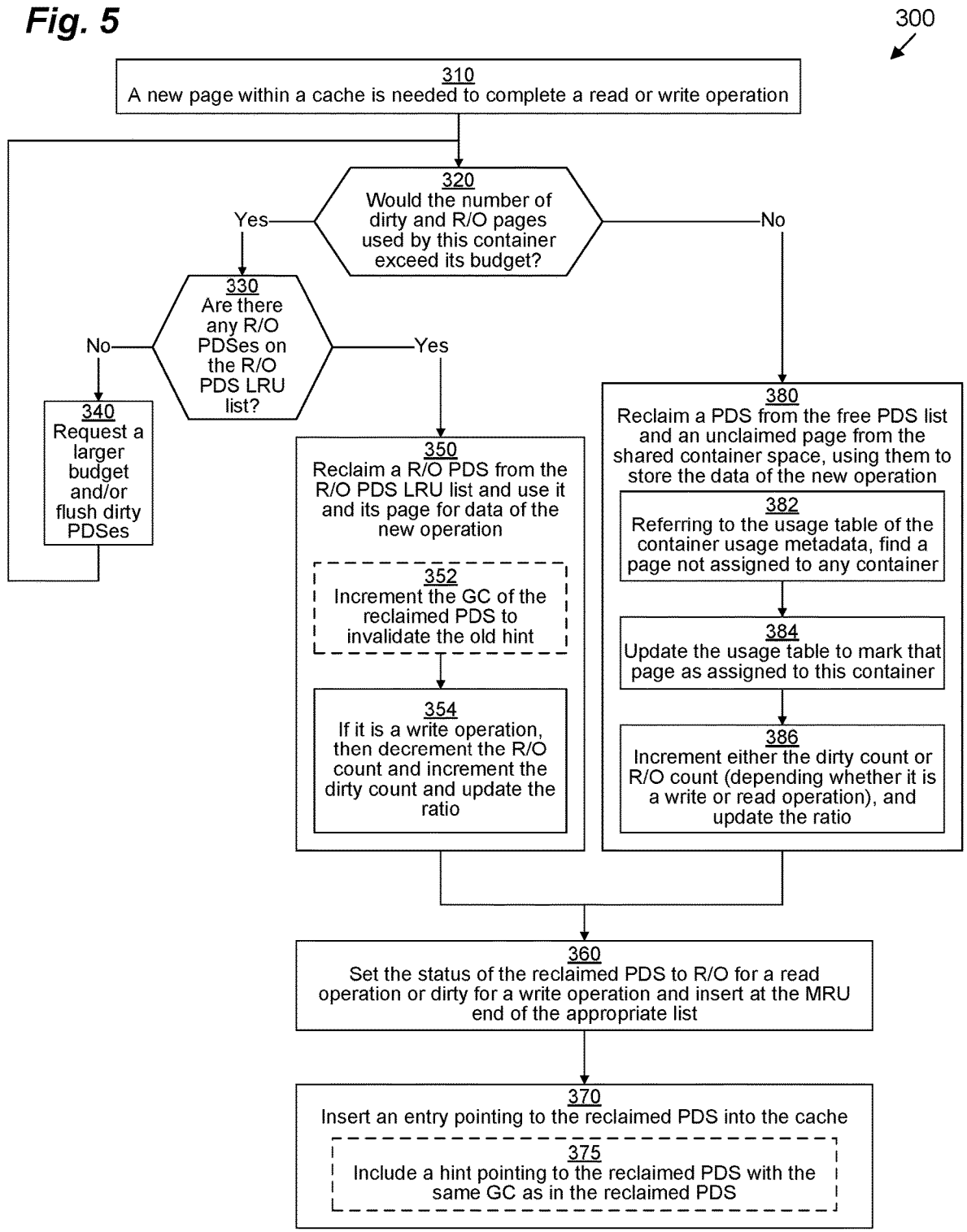
FIG. 5 is a flowchart depicting example methods according to various embodiments

FIG. 5 illustrates an example method 300 performed by data storage software 54 and an isolation management process 55 of a particular container 52 (e.g., container 52(a)) running on a DSS computing device 32 for provisioning pages 59 into a cache. It should be understood that one or more of the steps or sub-steps of method 300 may be omitted in some embodiments. Similarly, in some embodiments, one or more steps or sub-steps may be combined together or performed in a different order. Sub-steps 352 and 375 of method 300 marked with dashed lines may be deemed to be either optional or representative of alternative embodiments. Method 300 is performed by computing device 32.

In step 310, data storage software 54(a) attempts to complete a read or write I/O operation by inserting data (e.g., a block of data or metadata to be written to persistent storage 39; a block of data or metadata read from persistent storage) into a cache. If the data is not yet in the cache, a new page 59 may need to be obtained by data storage software 54(a) in which to store the data.

Then, in step 320, isolation enforcement process 55(a) determines whether or not the combined number of dirty and R/O pages 59 used by this container 52(a) would exceed its budget 66(a) upon completion of the I/O operation. This may be accomplished by reading the dirty count 234(a) and R/O count 236(a) from the container usage metadata 230 in the shared container space 64, summing them together, adding the number of pages 59 needed to complete the I/O operation, and comparing the sum to the budget 66(a) for the container 52(a). If the sum exceeds the budget 66(a), then operation proceeds with step 330. Otherwise, operation proceeds with step 380.

In step 330, isolation enforcement process 55(a) determines whether or not there any R/O PDSes 220 on the R/O PDS LRU list 242 of the container 52(a). If there are, then operation proceeds with step 350. Otherwise operation proceeds with step 340. In some embodiments, however, step 330 may not always proceed to step 350 even if there are any R/O PDSes 220 on the R/O PDS LRU list 242; rather, operation may instead proceed to step 340 if the number of R/O PDSes 220 on the R/O PDS LRU list 242 falls below a threshold minimal value that is greater than zero.

In step 350, data storage software 54(a) reclaims an R/O PDS 220 from the R/O PDS LRU list 242 and use that PDS 220 and the page 59 that it points to for data of the I/O operation. Step 350 includes removing the R/O PDS 220 pointed to by the LRU end pointer 256 from the R/O PDS LRU list 242, as is well-known in the art.

In some embodiments, step 350 includes sub-step 352, in which the data storage software 54(a) increments the GC 224 of the reclaimed PDS 220 to invalidate an old hint 214 that remains within a cache entry 208. It should be understood, however, that in some embodiments, hints 214 may not be used (cache entries 208 instead pointing directly to PDSes 220), in which case the use of GCs 224 may also be omitted.

Step 350 also includes sub-step 354, in which, if the I/O operation is a write operation, isolation enforcement process 55(a) decrements the R/O count 236(a) and increment the dirty count 234(a) within the shared container space 64. In some embodiments, sub-step 354 also includes updating the ratio 238(a) based on the new value of 234(a), but in other embodiments, the ratio 238(a) may instead be calculated only as needed.

Step 350 may be repeated if several new pages 59 are needed. After step 350, operation proceeds with step 360.

In step 360, data storage software 54(a) sets the status 222 of the reclaimed PDS 220 to dirty for a write operation or R/O for a read operation. In addition, data storage software 54(a) inserts the PDS 220 at the MRU end of either the dirty PDS LRU list 240 or R/O PDS LRU list 242 (depending whether the I/O operation is a write or a read), as is well-known in the art. Finally, in step 370, data storage software 54(a) inserts an entry 208 pointing to the reclaimed PDS 220 into the cache. In embodiments in which hints 214 are used, step 370 may include sub-step 375, in which inserting the entry 208 includes placing a hint 214 that includes a PDS pointer 216 that points to the reclaimed PDS 220 and a GC 218 that equals the current GC 224 of the reclaimed PDS 220. Method 300 may then terminate.

In step 340, since there are no R/O PDSes 220 on the R/O PDS LRU list 242 (or in some embodiments, since there are too few) available for reclamation, then either the budget 66(a) must be increased or one or more dirty PDSes 220 from the dirty PDS LRU list 240 may be flushed to persistent storage 39. A dirty PDS 220 cannot be directly reclaimed because the data in its page 59 has not yet been persisted, so reclamation would result in data loss. In one embodiment, if the number of dirty PDSes 220 exceeds a threshold maximum, flushing is performed; otherwise, isolation enforcement process 55(a) requests an increase to the budget 66(a). After step 340, operation returns back to step 320.

In step 380, since the combined number of dirty and R/O pages 59 used by this container 52(a) would not exceed its budget 66(a) upon completion of the I/O operation, an unclaimed page 59 may be claimed from the shared container space. Thus, in step 380, data storage software 54(a) reclaims a PDS 220 from the free PDS list 244, and isolation enforcement process 55(a) reclaims an unclaimed page 59 from the shared container space 64, so that the newly-claimed PDS 220 and page 59 can be used to store the data of the I/O operation. Step 380 includes data storage software 54(a) removing the invalid PDS 220 pointed to by the start pointer 260 from the free PDS list 244, as is well-known in the art.

Step 380 also includes sub-steps 382, 384, and 386. In sub-step 382, isolation enforcement process 55(a) refers to the usage table 232 in the container usage metadata 230 of the shared container space 64 to find a page 59 that is not assigned to any container 52 (e.g., page 59(4) in the example of FIG. 3). Then, in sub-step 384, isolation enforcement process 55(a) updates the usage table 232 to mark that page 59 (e.g., 59(4)) as claimed by the current container 52(a). Then, in sub-step 386, isolation enforcement process 55(a) increments either the dirty count 234(a) (if the I/O operation is a write operation) or the R/O count 236(a) (if the I/O operation is a read operation). Operation then proceeds with steps 360 and 370 as described above.

Figure 6:
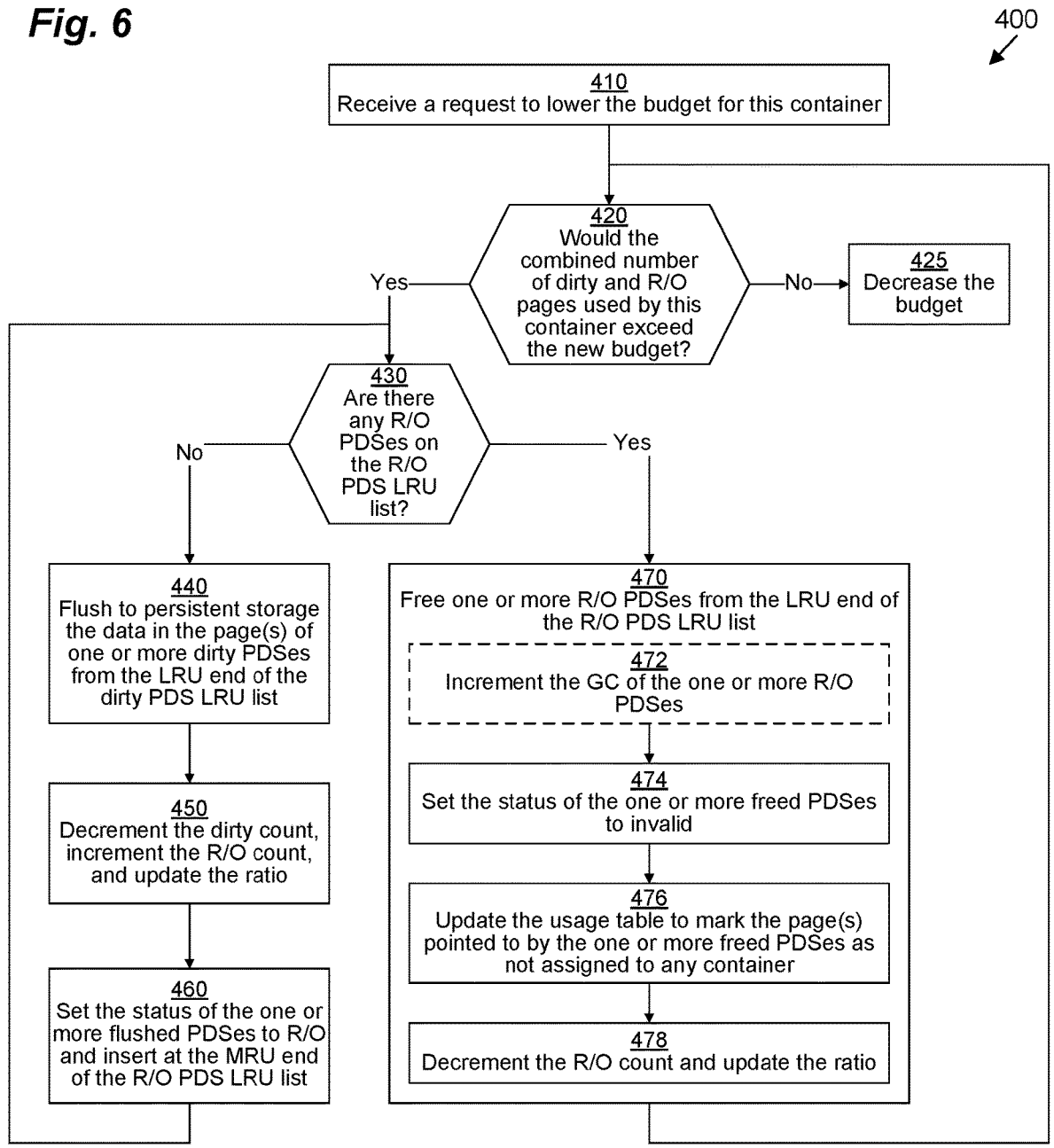
FIG. 6 is a flowchart depicting example methods according to various embodiments.

FIG. 6 illustrates an example method 400 performed by isolation management process 55 of a particular container 52 (e.g., container 52(a)) running on a DSS computing device 32 for decreasing the budget 66 of that container 52. It should be understood that one or more of the steps or sub-steps of method 400 may be omitted in some embodiments. Similarly, in some embodiments, one or more steps or sub-steps may be combined together or performed in a different order. Sub-step 472 of method 400 marked with dashed lines may be deemed to be either optional or representative of alternative embodiments. Method 400 is performed by computing device 32.

In step 410, isolation management process 55(a) receives a request to lower the budget 66(a) of its container 52(a). Then, in step 420, isolation management process 55(a) determines whether or not the combined number of dirty and R/O pages 59 used by this container 52(a) would exceed its budget 66(a) upon being decreased. This may be accomplished by reading the dirty count 234(a) and R/O count 236(a) from the container usage metadata 230 in the shared container space 64, summing them together, and comparing the sum to the requested new budget. If the sum exceeds the requested new budget, then operation proceeds with step 430. Otherwise, operation proceeds with step 425.

In step 425, since the requested new budget is consistent with the current state of the container 52(a), isolation management process 55(a) decreases the budget 66(a) as requested (e.g., by changing the value of the budget 66(a) as stored within the userspace container 52(a) and/or within the container usage metadata 230).

In step 430, isolation enforcement process 55(a) determines whether or not there any R/O PDSes 220 on the R/O PDS LRU list 242 of the container 52(a). If there are, then operation proceeds with step 470. Otherwise operation proceeds with step 440. In some embodiments, however, step 430 may not always proceed to step 470 even if there are any R/O PDSes 220 on the R/O PDS LRU list 242; rather, operation may instead proceed to step 440 if the number of R/O PDSes 220 on the R/O PDS LRU list 242 falls below a threshold minimal value that is greater than zero.

In step 470, isolation enforcement process 55(a) frees one or more R/O PDSes 220 from the LRU end of the R/O PDS LRU list 242. Step 470 includes removing the R/O PDS 220 pointed to by the LRU end pointer 256 from the R/O PDS LRU list 242 (and some of the following R/O PDSes 220 if more than one), as is well-known in the art.

In some embodiments, step 470 includes sub-step 472, in which the isolation enforcement process 55(a) increments the GC 224 of the freed PDS(es) 220 to invalidate an old hint 214 that remains within a cache entry 208. It should be understood, however, that in some embodiments, hints 214 may not be used (cache entries 208 instead pointing directly to PDSes 220), in which case the use of GCs 224 may also be omitted.

Step 470 also includes sub-steps 474, 476, 478. In sub-step 474, isolation enforcement process 55(a) sets the status 222 of the freed PDS(es) 220 to invalid. In addition, data storage software 54(a) inserts the freed PDS(es) 220 into the free PDS list 244, as is well-known in the art. Then, in sub-step 476, isolation enforcement process 55(a) updates the usage table 232 to mark the page(s) 59 that was/were pointed to by the freed PDS(es) 220 as being not claimed by any container 52. Then, in sub-step 478, isolation enforcement process 55(a) decrements the R/O count 236(a) within the shared container space 64 for each of the freed PDS(es) 220. In some embodiments, sub-step 478 also includes updating the ratio 238(a) based on the new value of 234(a), but in other embodiments, the ratio 238(a) may instead be calculated only as needed. Operation then returns back to step 420 to check if enough pages 59 have been freed.

In step 440, since there are no R/O PDSes 220 on the R/O PDS LRU list 242 (or in some embodiments, since there are too few) available to be freed, then, in order for the budget 66(a) to be decreased, one or more dirty PDSes 220 from the dirty PDS LRU list 240 must be flushed to persistent storage 39, which results in the total number of pages 59 actually used by the container 52(a) to drop. Recall that a dirty PDS 220 cannot be directly freed because the data in its page 59 has not yet been persisted, so freeing would result in data loss. Thus, step 440 performs flushing rather than freeing.

Then, in step 450, isolation enforcement process 55(a) decrements the dirty count 234(a) and increment the R/O count 236(a) within the shared container space 64 for each of the flushed PDS(es) 220. In some embodiments, step 450 also includes updating the ratio 238(a) based on the new value of 234(a), but in other embodiments, the ratio 238(a) may instead be calculated only as needed.

Then, in step 460, isolation enforcement process 55(a) sets the status 222 of the flushed PDS(es) 220 to R/O. In addition, data storage software 54(a) inserts the flushed PDS(es) 220 at the MRU end of the R/O PDS LRU list 242, as is well-known in the art. After step 460, operation returns back to step 430.

Figure 7:
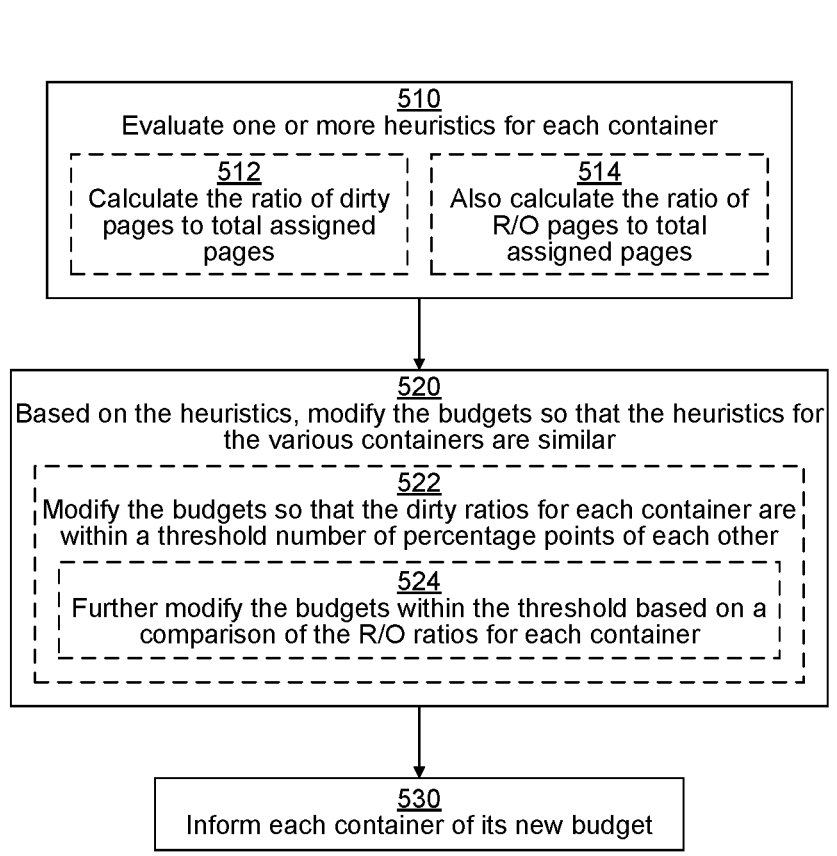
FIG. 7 is a flowchart depicting example methods according to various embodiments.

FIG. 7 illustrates an example method 500 for dynamically adjusting the budgets 66 of the containers 52. It should be understood that one or more of the steps or sub-steps of method 500 may be omitted in some embodiments. Similarly, in some embodiments, one or more steps or sub-steps may be combined together or performed in a different order. Sub-steps 512, 514, 522, and 524 of method 500 marked with dashed lines may be deemed to be either optional or representative of alternative embodiments. Method 500 is performed by computing device 32.

In some embodiments, method 500 may be performed by a single process on behalf of all containers 52 that share access to the shared container space 64. In other embodiments, method 500 may be performed cooperatively by isolation enforcement processes 55 running on each of the containers 52 that share access to the shared container space 64.

In some embodiments, method 500 may be performed periodically in the background (e.g., every second or every hour). In other embodiments, method 500 may be invoked upon a trigger condition.

In step 510, one or more heuristics may be evaluated for each container 52 that shares access to the shared container space 64. This may be performed separately by each isolation enforcement processes 55 on behalf of its own container 52 or it may be performed by one of the isolation enforcement processes 55 or another process on behalf of all of the containers 52 that share access to the shared container space 64. In some example embodiments, step 510 may include sub-step 512. In some of these embodiments, step 510 may also include sub-step 514. In sub-step 512, the heuristic that is calculated is the ratio 238 of the dirty page count 234 for a container 52 divided by the total number of pages 59 assigned to that container 52. In sub-step 514, another heuristic that is calculated is the R/O ratio of the R/O page count 234 for that container 52 divided by the total number of pages 59 assigned to that container 52.

In step 520, the isolation enforcement processes 55 or the one central process modifies the budgets 66 for each of the containers 52 based on the calculated heuristics in order to cause the heuristics to become more similar. In some example embodiments, step 520 may include sub-step 522. In sub-step 522, the budgets 66 of the various containers 52 are modified so that the dirty ratios 238 for each container 52 are all within a threshold number of percentage points of each other. Thus, for example, if initially the ratio 238(a) for container 52(a) is 42% and the ratio 238(N) for container 52(N) is 13%, but the threshold is predefined to be 10 percentage points, then the budget 66(N) for container 52(N) is decreased in order to increase the ratio 238(N), and the budget 66(a) for container 52(a) is increased in order to decrease the ratio 238(a). Thus, for example, if the initial budget 66(a) for container 52(a) is 6 million, and the initial budget 66(N) for container 52(N) is 4 million, then if budget 66(a) is increased to 7.71 million and the budget 66(N) is decreased to 2.29 million, then the ratio 238(a) falls to about 32.7% and the ratio 238(N) rises to about 22.7%, just within the threshold of 10 percentage points. However, there are a range of solutions: any value for ratio 238(a) between about 7.71 million and 8.669 million will be a valid solution.

In order to further limit the solution, sub-sub-step 524 may also be performed. In sub-sub-step 524, the budgets 66 may further be modified within the acceptable range by also attempting to get the R/O ratios for the containers 52 to be as close as possible. Thus, continuing in the above example, if the initial R/O ratio for container 52(a) is 33.333% and the initial R/O ratio for container 52(N) is 12.5%, then by setting budget 66(a) to 8 million and budget 66(N) to 2 million, the resulting R/O ratio for container 52(a) is about 25% and the resulting R/O ratio for container 52(N) is also 25%. Since this is within the acceptable range of budgets 66 from step 522, sub-step 524 results in budget 66(a) being increased from 6 million to 8 million and budget 66(N) being decreased from 4 million to 2 million.

It should be understood that these heuristics are given by way of example only. Various other heuristics are also possible.

Finally, in step 530, the budgets 66 calculated in step 520 are communicated to each container 52 so that each container 52 may implement its new budget (see above in connection with FIG. 6). Thus, as the relative memory needs of the containers 52 change, the budgets 66 assigned to each are able to dynamically vary by operation of method 500.

Thus, techniques have been presented for implementing containers 52 that are able to utilize memory resources in a dynamic manner by instantiating multiple containers 52(a), 52(N) and assigning them an overlapping memory space 64, while implementing a mechanism to allow the containers 52 to claim and release portions (e.g., pages 59) of the overlapping memory space 64 dynamically. In some embodiments, the mechanism employs page assignment metadata 230 shared between the containers 52. In some embodiments, the dynamic sharing of the memory resources may involve e indirect mapping (e.g., using PDSes 220). In some embodiments, cooperative budgeting is employed to dynamically apportion the overlapping memory space 64 based on memory needs. The improved approach thus achieves the reduced overhead associated with containers 52 without sacrificing the ability to dynamically allocate memory between or among containers 52. The improved approach is thus efficient and cost-effective without sacrificing functionality.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A computerized method for dynamically allocating memory between containers that run on a shared operating system kernel of a computing device, each container being an isolated user-space instance, the method comprising:
    assigning a first portion of memory to a first container and a second portion of memory to a second container different from the first container, the first portion and the second portion overlapping to form a shared portion of memory assigned to both the first container and the second container;
    during a first time interval, caching first data in a particular page of the shared portion by first data storage software executing within the first container;
    during a second time interval, which occurs entirely after the first time interval has ended, caching second data different from the first data in the particular page of the shared portion by second data storage software different from the first data storage software and executing within the second container;
    during the first time interval, selectively enabling the first data storage software to access the particular page and blocking the second data storage software from accessing the particular page;
    during the second time interval, selectively enabling the second data storage software to access the particular page and blocking the first data storage software from accessing the particular page; and
    assigning a first budget to the first container and a second budget to the second container, each budget defining a maximum number of pages of the shared portion that the respective container is allowed to utilize at a time, a sum of the maximum number of pages of both budgets not exceeding a total number of pages within the shared portion.

2. The method of claim 1 wherein the method further comprises updating the first budget and the second budget in response to changes in memory requirements of the first container and the second container.

3. The method of claim 2 wherein the method further comprises detecting the changes in memory requirements of the first container and the second container by evaluating a heuristic based on numbers of pages of the shared portion used by each container to store dirty write-cache data, the dirty write-cache data reflecting cached data that is more recent than corresponding versions of that data in persistent data storage.

4. The method of claim 3 wherein each of the first container and the second container includes a respective process executing thereon that performs the evaluating of the heuristic, and wherein updating the first budget and the second budget further includes cooperatively assigning, by the respective processes, the first budget and the second budget based on the evaluated heuristic.

5. The method of claim 1,
    wherein each container is configured to store a set of page descriptor structures (PDSes) within its assigned memory portion outside of the shared portion, each PDS being maintained either (i) in a valid state that indicates that the PDS points to a page of the shared portion that the respective container is enabled to access or (ii) in an invalid state that indicates that the PDS does not point to a page of the shared portion that the respective container is enabled to access; and
    wherein the method further comprises operating an enforcement policy within each container, each enforcement policy configured to ensure that a number of valid PDSes within the assigned memory portion of the respective container does not exceed the maximum number of pages of the shared portion that the budget of the respective container defines.

6. The method of claim 5 wherein blocking the first data storage software from accessing the particular page during the second time interval includes, after termination of the first time interval, determining that the first data storage software no longer needs the first data to be cached, and, in response:
    invalidating a particular PDS stored in the first portion of memory that pointed to the particular page and
    updating metadata stored in the shared portion to indicate that the particular page is no longer claimed by the first container.

7. The method of claim 6 wherein invalidating the particular PDS includes causing the particular PDS to no longer point to the particular page.

8. The method of claim 6,
    wherein the data storage software of each container maintains a cache that includes cache entries, each cache entry including a hint that indicates that at some point an associated PDS pointed to a page of data in the shared portion referenced by that cache entry, the hint remaining valid as long as a generation count of the hint equals a generation count of the associated PDS; and
    wherein invalidating the particular PDS includes incrementing a generation count of the particular PDS so that all hints to the particular PDS within the first container having an unincremented generation count are deemed to be invalid due to expiration.

9. The method of claim 6 wherein enabling the second data storage software to access the particular page during the second time interval includes, prior to the second time interval, determining that no page of the shared portion currently claimed by the second container is free to store the second data on behalf of the second data storage software and, in response:
- determining that a current number of pages of the shared portion currently claimed by the second container is less than the budget of the second container, yielding an affirmative determination;
- selectively, in response to the affirmative determination, reading the metadata stored in the shared portion, thereby obtaining an indication that the particular page is unclaimed;
- in response to obtaining the indication that the particular page is unclaimed, updating the metadata stored in the shared portion to indicate that the particular page has been claimed by the second container; and
- after updating the metadata stored in the shared portion to indicate that the particular page has been claimed by the second container, setting another PDS stored in the second portion of memory to point to the particular page and to be in a valid state.

10. The method of claim 1 wherein the method further comprises:
- assigning a third portion of memory to a third container, the third portion of memory including the shared portion, the shared portion also being assigned to the third container, wherein third data storage software executes within the third container;
- selectively blocking the third data storage software from accessing the particular page during the first time interval and the second time interval; and
- assigning a third budget to the third container, the third budget defining a maximum number of pages of the shared portion that the third container is allowed to utilize at a time, a sum of the maximum number of pages of the first budget, the second budget, and the third budget not exceeding the total number of pages within the shared portion.

11. The method of claim 1 wherein the first data storage software is configured to provide block-based access to logical disks of persistent data storage and the second data storage software is configured to provide file-based access to filesystems of persistent data storage.

12. The method of claim 11 wherein assigning the first budget to the first container and the second budget to the second container includes, at an initial startup time, initially establishing the first budget as larger than the second budget.

13. The method of claim 12 wherein the method further comprises updating the first budget and the second budget in response to changes in memory requirements of the first container and the second container.

14. The method of claim 1 wherein the first portion of memory and the second portion of memory are both drawn from system memory of the computing device, the first portion of memory and the second portion of memory both sharing a single low-level address space.

15. A data storage apparatus comprising:
- a set of persistent storage device that provide persistent storage; and
- processing circuitry and memory communicatively-coupled to the persistent storage, the processing circuitry and memory being configured to dynamically allocate memory between containers that run on a shared operating system kernel of the data storage apparatus, each container being an isolated user-space instance, by:
  - assigning a first portion of memory to a first container and a second portion of memory to a second container different from the first container, the first portion and second portion overlapping to form a shared portion of memory assigned to both the first container and the second container;
  - during a first time interval, caching first data in a particular page of the shared portion by first data storage software executing within the first container;
  - during a second time interval, which occurs entirely after the first time interval has ended, caching second data different from the first data in the particular page of the shared portion by second data storage software different from the first data storage software and executing within the second container;
  - during the first time interval, selectively enabling the first data storage software to access the particular page and blocking the second data storage software from accessing the particular page;
  - during the second time interval, selectively enabling the second data storage software to access the particular page and blocking the first data storage software from accessing the particular page; and
  - assigning a first budget to the first container and a second budget to the second container, each budget defining a maximum number of pages of the shared portion that the respective container is allowed to utilize at a time, a sum of the maximum number of pages of both budgets not exceeding a total number of pages within the shared portion.

16. A computer program product comprising a non-transitory computer-readable storage medium storing a set of instructions, which, when performed by a processing circuitry of a computing device, cause the computing device to dynamically allocate memory between containers that run on a shared operating system kernel of the computing device, each container being an isolated user-space instance, by:
- assigning a first portion of memory to a first container and a second portion of memory to a second container different from the first container, the first portion and the second portion overlapping to form a shared portion of memory assigned to both the first container and the second container;
- during a first time interval, caching first data in a particular page of the shared portion by first data storage software executing within the first container;
- during a second time interval, which occurs entirely after the first time interval has ended, caching second data different from the first data in the particular page of the shared portion by second data storage software different from the first data storage software and executing within the second container;
- during the first time interval, selectively enabling the first data storage software to access the particular page and blocking the second data storage software from accessing the particular page;
- during the second time interval, selectively enabling the second data storage software to access the particular page and blocking the first data storage software from accessing the particular page; and
- assigning a first budget to the first container and a second budget to the second container, each budget defining a maximum number of pages of the shared portion that the respective container is allowed to utilize at a time, a sum of the maximum number of pages of both budgets not exceeding a total number of pages within the shared portion.

* * * * *